United States Patent [19]

Kisbany

[11] 3,899,917

[45] Aug. 19, 1975

[54] LABORATORY WEAR RESISTANCE TEST MACHINE FOR TIRES

[76] Inventor: Frederick N. Kisbany, 464 Lexington Rd., Gross Pt. Farms, Mich. 48236

[22] Filed: Dec. 6, 1973

[21] Appl. No.: 422,459

[52] U.S. Cl. .................................. 73/8; 51/106 R
[51] Int. Cl. .......................................... G01n 3/56
[58] Field of Search ............ 73/8, 7, 146; 51/106 R, 51/273

[56] References Cited
UNITED STATES PATENTS

| | | | |
|---|---|---|---|
| 1,850,056 | 3/1932 | Abbott | 73/7 |
| 2,333,599 | 11/1943 | Terry | 51/106 R |
| 3,256,648 | 6/1966 | Subonovich | 51/273 |
| 3,343,399 | 9/1967 | Baker | 73/7 |
| 3,553,903 | 1/1971 | Christie | 51/106 R |
| 3,740,710 | 6/1973 | Weintraub et al. | 73/8 X |

FOREIGN PATENTS OR APPLICATIONS

| | | | |
|---|---|---|---|
| 542,575 | 8/1922 | France | 73/8 |
| 660,467 | 11/1951 | United Kingdom | 73/7 |

*Primary Examiner*—Jerry W. Myracle
*Assistant Examiner*—Daniel M. Yasich
*Attorney, Agent, or Firm*—Peter Taucher; John McRae; Robert Gibson

[57] ABSTRACT

A tire wear tester wherein a relatively small diameter abrasive wheel rolls on the tread area of the tire under test. The tire is mounted to rotate at a known rate or for a known number of revolutions so that the abrasive wheel forms a groove in the tread surface. Measurements are made of the depth of the groove and/or the quantity of tire tread particulates generated during the groove-forming action. These measurements are taken as relative indications of the wearability of the tire being tested. Road service loads or pressures are simulated by means of a freely-rotatable drum urged against the tire tread area by means of a fluid cylinder or similar power device.

8 Claims, 5 Drawing Figures

LABORATORY WEAR RESISTANCE TEST MACHINE FOR TIRES

The invention described herein may be manufactured, used, and licensed by or for the Government for governmental purposes without payment to me of any royalty thereon.

BACKGROUND OF THE INVENTION

U.S. Pat. No. 1,669,622 issued to V. V. Messer on May 15, 1928 shows a tire testing apparatus wherein twelve tires are rotatably mounted on the spokes of a large rotary carrier in "ferris wheel" fashion. The carrier is powered so that the tires move into and out of a semi-circular trench or track having a lining of concrete, asphalt or other surface representative of conventional road surfaces. Periodically the tires may be visually inspected to ascertain tire tread wear.

U.S. Pat. No. 3,604,245 issued to E. J. Atelian on Sept. 14, 1971 shows an apparatus comprising a "ferris wheel" carrier for six tires. In this case the carrier is held motionless during the test. A powered rotary drum is located within the motionless carrier to move against the tread surfaces of the tire and thereby impart rotation to the tires. Presumably visual observations are periodically made of the tires to determine the tire condition.

THE PRESENT INVENTION

The devices of the prior art, as represented by the two above mentioned patents, are advantageous in that they apparently permit a plurality of tires to be simultaneously tested. However the devices are relatively large and costly so that their use is probably confined to tire manufactures or tire research facilities. The present invention seeks to provide a relatively simple, low-cost tire wear tester that can be installed in facilities where tire testing may be on an intermittent or small quantity basis. Examples of such an installation would be at a tire wholesaler, a commercial trucking fleet, a car rental fleet or a military truck depot or procurement facility.

In the present invention, as exemplified in the drawing, a single tire is located below a small abrasive wheel so that when the tire is powered about its axis the wheel wears a relatively narrow groove in the tire tread surface. A weight or similar device maintains the wheel in engagement with the tire tread. The test apparatus includes means for collecting the tread particulates generated by the groove-forming action, as well as mechanical gages for measuring the depth of the groove after a predetermined number of tire revolutions.

The invention possesses some advantages over known tire testers, including small size, low cost, time-accelerated results, capability for cross-checking the results using two different parameters (groove depth and weight of tread particulates), and reproducibility of results.

THE DRAWINGS

Figure 1:
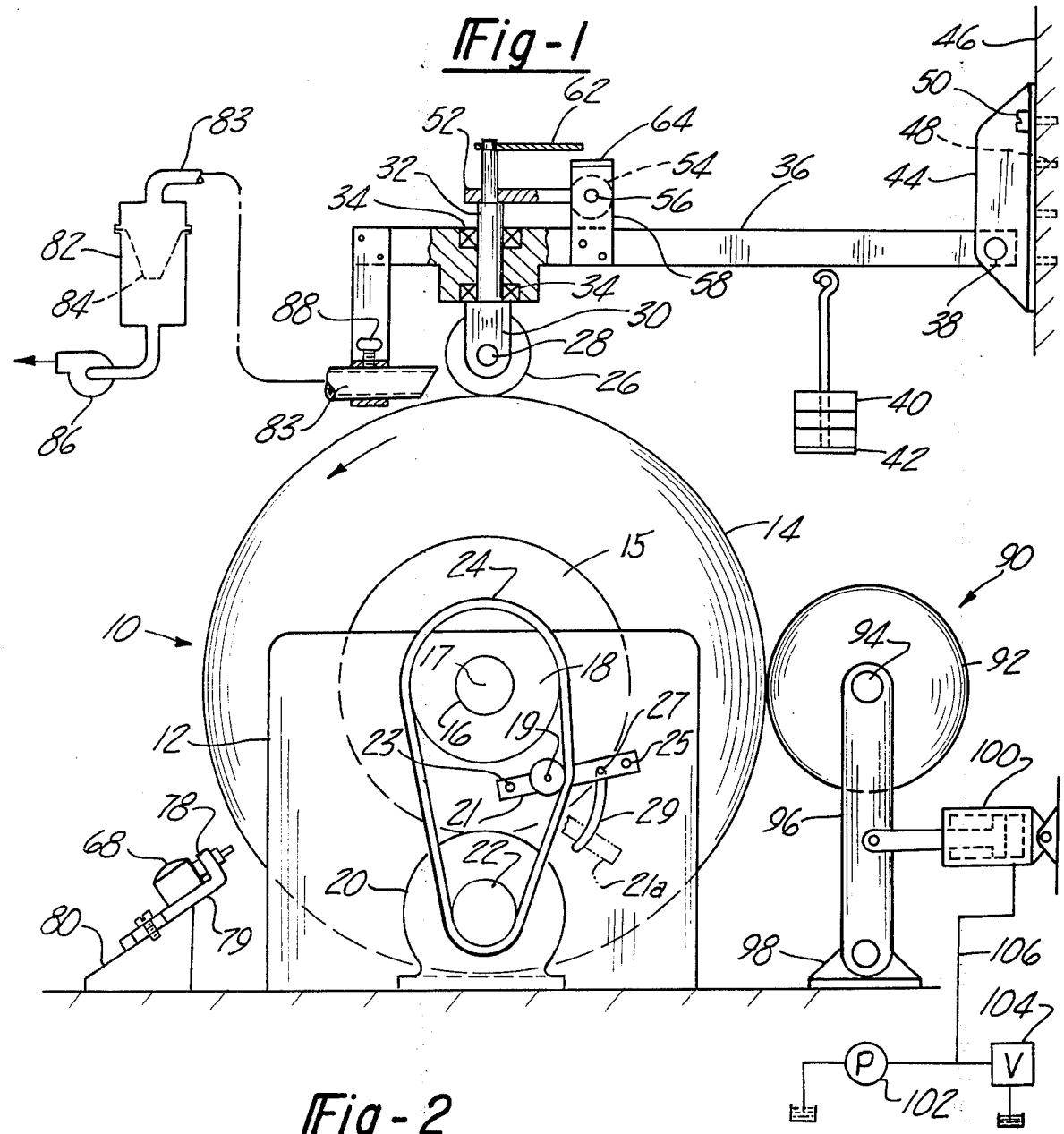
FIG. 1 is a semi-schematic side elevational view of an apparatus incorporating the invention.
Figure 5:
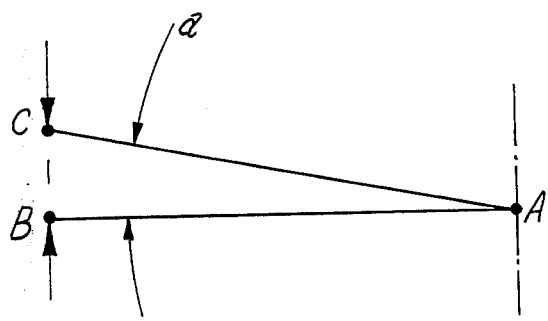

FIG. 5 diagramatically illustrates relative motions of a tire and abrasive wheel used in the FIG. 1 tester.

THE DRAWINGS IN DETAIL

FIG. 1 illustrates a tire wear tester 10 comprising a stand or fixture 12 adapted to rotatably support a conventional tire 14 mounted on a conventional wheel disc 15 of the type used on automobiles, trucks, airplanes, buses, etc. The tire disc assembly is mounted to an axle 16 that carries a pulley or sprocket 18. A variable speed electric motor or other variable rotary power means 20 carries a second pulley or sprocket 22. A belt or chain 24 is trained around members 18 and 22, such that when motor 20 is energized the tire 14 will be rotated around its central axis 17 at a predetermined speed. A revolution counter (not shown) may be associated with the shaft of motor 20 so that after the elapse of a predetermined number of revolutions an alarm is sounded or motor 20 is de-energized. The aim is to permit measurement of tire wear after a known period of operation in the tester.

It may be desirable at certain times to rotate the tire at relatively slow speeds by hand manipulation. Accordingly the FIG. 1 test apparatus incorporates means to disengage the drive from motor 20 to pulley 18. The disengagement means includes a belt-engaged pulley 19 carried on a lever 21 having a pivot mounting at 23. The lever is equipped with a handle 25 for moving the lever downwardly to the "disengaged" dotted line position 21a wherein the belt is loose on pulleys 22 and 18. To limit the lever movement the lever is provided with a pin 27 that moves in an arcuate slot 29 in the stationary wall structure.

The tester includes a tire tread abrading means in the form of an abrasive-surfaced wheel 26. The wheel includes an axle 28 journalled within a caster frame 30 having a stem 32 equipped with bearings 34 in a barlike lever 36. Wheel 26 can freely rotate around the horizontal axis defined by axle 28; additionally the wheel can be adjusted about the vertical axis defined by stem 32. The purpose of the adjustment about the stem 32 axis is to enable wheel 26 to have its diammetrical plane set at various different selected angles relative to the diammetrical plane of tire 14. For example, assuming that tire 14 is in the plane of the paper, then wheel 26 can be adjusted so that its diammetrical plane is at a slight angle relative to that plane, e.g. 5 radial degrees. The angular relationship enables the wheel surface and tread surface to have slightly different velocity components in the tire plane, thereby producing an abrading action on the tread surface. Wheel 26 may be formed in the fashion of conventional grinding wheels, with fine or coarse abrasive particles, preselected as to grain or mesh size.

Suitable abrasive wheels are available under the trade designation "Taber" wheel. Such wheels have advantages over wheels or track surfaces formed of other materials, in such respects as reproducibility of results and anti-plugging action. A used wheel of given grain size or character can be replaced by another new wheel having substantially the same abrading capability. Accordingly the use of such wheels gives reproducibility of results over extended periods of time. There should be no need to "recalibrate" the machine at stated time intervals or wheel replacement times.

The wheel-supporting lever 36 is provided with a fixed pivot or fulcrum 38 arranged so that wheel 26 rides on tire 14 directly above axle 16. The gravitational weight of the lever-wheel assembly therefore acts directly normal to the tire tread surface. This weight may be augmented and/or adjusted by the addition or subtraction of weights 40 on a weight carrier 42 suspended from bar 36. The aim is to achieve a predetermined frictional pressure between the wheel surface and tire tread surface so that the wheel neither accelerates relative to the tire not bumps up out of tractive engagement with the tire.

To adapt the apparatus to use with different diameter tires lever 36 may be adjusted vertically, as by relocating the mount bracket 44 at different elevations on stationary surface 46. The drawing shows various holes 48 for selective reception of the bracket-anchor bolts 50 to accomplish lever 36 relocation. Other means may of course be employed for this purpose.

Figure 2:
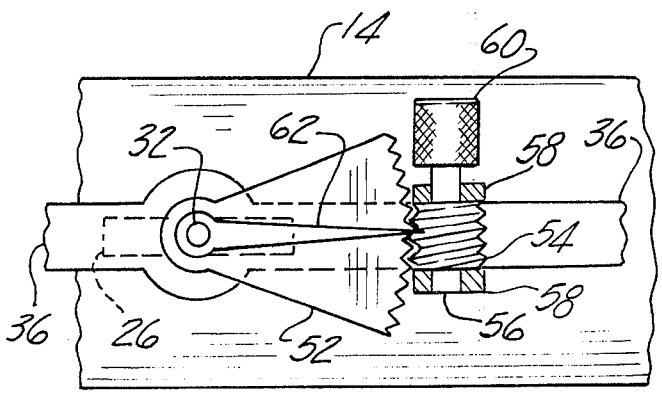
FIG. 2 is a fragmentary top plan view of the FIG. 1 apparatus.

FIG. 2 illustrates a mechanism for adjusting wheel 26 about the axis of stem 32 to obtain a controlled abrading action. The stem carries a gear segment 52 whose teeth mesh with the teeth of worm wheel 54. The shaft 56 for the worm wheel is shown mounted in paralled plates 58 suitably secured to bar 36. A manual adjustment knob 60 is attached to shaft 56 to rotate worm wheel 54 and thereby in turn rotate gear segment 52 and stem 32.

Figure 3:
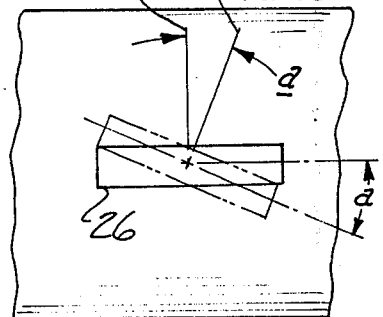
FIG. 3 illustrates the abrasive wheel-adjustment feature used in the FIG. 1 apparatus.

FIG. 3 illustrates in full lines the zero or "no abrade" position of wheel 26; the dotted lines show the wheel in one of its angularly adjusted positions in which it exerts a controlled abrading action on the tire tread surface. In general, the greater the angularity of the wheel (as measured by angle $a$ in FIG. 3) the greater will be the abrading effect of the wheel on the tire tread surface. The weight loaded onto carrier 42 (FIG. 1) will also have an effect on the abrading action.

The angularity of wheel 26 is selected before motor 20 is energized. The selected angle may be achieved by observation of a suitable pointer-scale mechanism associated with the adjusting apparatus. As shown in FIG. 1, the pointer 62 is attached to stem 32, and the scale plate 64 is attached to the upper edges of plates 58. Scale plate 64 is omitted from FIG. 2 to facilitate a view of worm 54. When the selected angle is achieved the wheel 26 may be locked in the selected angle by suitable detent mechanism, not shown. Such a mechanism could be interposed between caster frame 30 and lever 36, or between gear segment 52 and lever 36, or between worm 54 and lever 36.

FIG. 5 illustrates diagrammatically the relative motions of the tire tread surface and the wheel 26 surface when the wheel 26 is adjusted to have its diammetrical plane at an angle $a$ to the diammetrical plane of the tire. Line A–B represents the plane of the tire, and line A–C represents the plane of wheel 26. Assuming that a representative area of the tire tread surface moves from point A to point B, during such movement the corresponding surface area of the abrasive wheel will have moved from point A to point C. Length B–C represents the relative slidable displacement of the abrasive wheel on the tread during the indicated tire movement. The relative sliding movement produces the desired abrading action, assuming the abrasive wheel has sufficient frictional contract with the tire tread surface (as determined by the value of weights 40).

The angular adjustment of wheel 26 about the stem 32 axis (i.e. angle $a$) determines the relative sliding action of the wheel on the tread surface. With the wheel adjusted into parallelism with the tire (as shown in FIG. 2) angle $a$ is zero and there is substantially no abrading action; the wheel rolls along plane A–B (FIG. 5) with no relative sliding interaction between the wheel surface and tread surface. As the adjustment knob 60 (FIG. 2) is turned to increase angle $a$ the relative sliding action (denoted by line B–C) increases to thereby increase the abrading effect. Knob 60 is of course operated with the tire motionless, prior to energization of motor 20.

Figure 4:
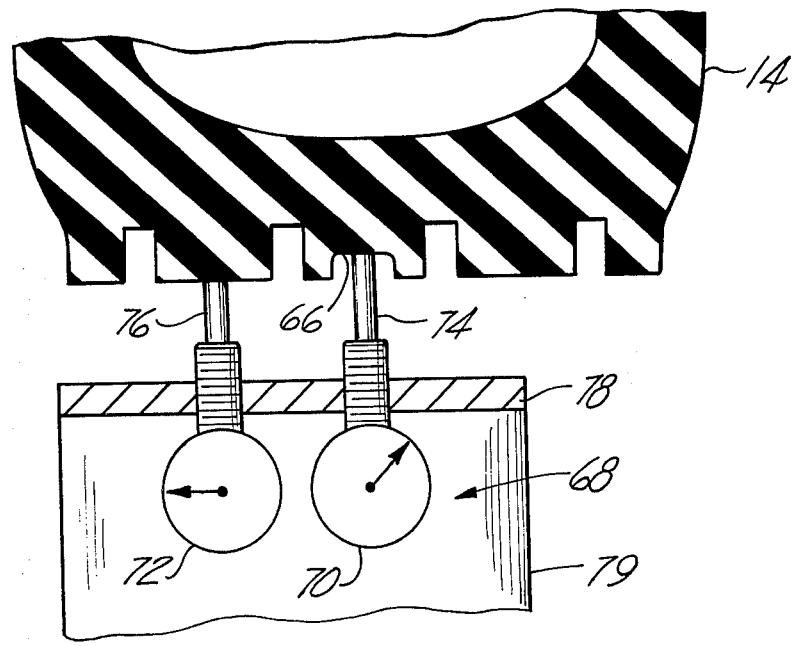
FIG. 4 is an enlarged fragmentary view illustrating a groove depth gage means used in the FIG. 1 apparatus.

FIG. 4 illustrates a gage mechanism 68 for measuring the progress or extent of the abrading action, hence the wearability of the tire tread. As shown in FIG. 4, the abrading action has produced a groove 66 in the tread surface; gage mechanism 68 is used to measure the depth of the groove, and hence the progress of the abrading action. In actual practice gage mechanism 68 is retracted from the tire surface while motor 20 is operating the tire at high speed approximating road service speeds. The gage is advanced from the FIG. 1 "retracted" position to the FIG. 4 "tire-engaged" position when the tire is at rest in any one of several previously determined positions. The tire may be marked at one or more points around its periphery where it is desired to take wear measurements.

The gage mechanism includes two conventional dial indicators 70 and 72 equipped with plunger-type sensors 74 and 76. The barrel portions of the indicators are suitably mounted in a support plate 78 so that both gages can simultaneously be advanced into contact with the tire tread surface. As shown in FIG. 1, plate 78 includes a flat base section 79 slidably positioned on an inclined guideway 80. The guide-way is angled so that the gage mechanism is adjustable in a radial direction relative to the tire axis 17.

In use of the gage mechanism, plate 78 can be advanced to cause the plungers 74 and 76 to contact the tire tread surface. The difference in the deflections of the plungers represents the depth of groove 66. Use of two dial indicators on a common plate 78 is advantageous in that the "difference" readout is substantially independent of the contact pressure between the plungers and the tread surface. The contact pressure can be light or heavy without causing readout error because both plungers will presumably have the same contact pressure.

The progress of the tire abrading action can also be determined by measuring the amount of particulates generated. In the FIG. 1 apparatus an illustrative particulate collection mechanism includes a suction tube 83 leading to a housing 82 containing a porous filter bag or cup 84. An induced draft fan or blower 86 provides the necessary vacuum condition in tube 83. Tube 83 is preferably suspended from bar 36 so that it will have the necessary orientation relative to wheel 26. Presumably most, if not all, of the tire tread particulates will be discharged from the tire tread surface in the direction of tire motion; i.e., counter-clockwise with respect to the tire axis in the FIG. 1 arrangement. Tube 83 is located in the path taken by the particulates to ensure their capture in the tube. Blower 86 provides the vacuum force necessary to convey the particulates into collector element 84.

Various adjustment devices and tube constructions may be necessary to ensure capture of representative quantities of tire tread particulates. FIG. 1 shows a set screw 88 for enabling the mouth of tube 83 to be moved forward or away from wheel 26 as found necessary for optimum collection purposes. Tube 83 should of course be wide enough to capture the particulates in any position of wheel 26; i.e. with the wheel set at various different angles $a$ (FIG. 3). The mouth of the tube should be wider than the maximum width of groove 66. Wheel 26 is preferably on the order of one half inch wide (axial dimension), but the wheel will form grooves 66 that are wider than one half inch when the wheel is adjusted to a large angle $a$. Tube 83 should be sized in relation to the width of the wheel and the contemplated range of wheel angle adjustment. Abrading effects are attainable at relatively low wheel angles. Therefore sizing of the tube 83 mouth should not be a problem.

It is contemplated that the quantity of collected particulates can be determined by weighing procedures. With relatively large diameter tires fairly large quantities of particulates can be collected per unit depth of groove 66. This means that measurements can be taken when groove 66 is still relatively shallow. The advantage is that test results are attainable quickly, and with only minor disfigurement of the tire. If the groove was very shallow at termination of the test, the tested tire could conceivably be put into service rather than discarded.

During service on the road tires commonly flex under load forces, thereby generating heat energy that may not be fully dissipated into the ambient atmosphere. The retained heat is believed to contribute to rubber degradation that adversely affects tread wear. In the FIG. 1 test apparatus the frictional contact between wheel 26 and the tire tread is insufficient to generate any appreciable quantity of heat. An approximation of road service heat build-up may be achieved by locating the test apparatus in an oven (not shown). It is believed that the apparatus is constructible so that oven operations or cold room operations would be feasible without excessive money expenditure.

FIG. 1 illustrates a mechanism 90 for achieving tire flexure that produces tire heat or mechanical stresses in the tire somewhat as in road service load conditions.

The illustrated mechanism includes a cylindrical smooth-surfaced drum 92 freely rotatable on an axle 94 suitably carried on an arm structure 96 pivotally connected to foot structure 98. The drum is forced against the tire tread by means of a single acting fluid cylinder 100 that receives power fluid from pump 102. A relief valve 104 can be employed to maintain a predetermined pressure in high pressure line 106 and hence in cylinder 100.

Drum 90 exerts a loading force on the tire tread to produce tire flexure in a fashion analogous to flexures produced under actual service conditions. The drum mechanism thus provides for heat build-up in the tire such that the abrasion test results with wheel 26 become more representative of actual expected tire wear. Drum 90 is preferably smooth and freely rotatable so that it does not abrad the tire.

It will be understood that the number of tire revolutions required to produce a given depth groove 66 will not necessarily be the same number of tire revolutions needed to produce a corresponding degree of wear on the road. The surface characteristics of wheel 26, as well as the value of weight 40 and the angulation $a$ of the wheel, will determine the number of tire revolutions needed to produce a given depth groove 66. The test apparatus is intended to be used for a time-accelerated comparison evaluation of test tires relative to other previously tested tires known to have satisfactory wear characteristics.

One advantage of the apparatus is that wheel 26 generates a relatively narrow groove in the tread surface. The relatively small energy interchange associated with the generation of such a narrow groove is such that test results can be obtained rather quickly and at relatively low cost; the machine can be a relatively light gage structure because of the small energy interchange.

I claim:

1. A tire wear tester comprising power means for rotating a tire under test; a non-powered abrasive wheel freely rotatably mounted so that its peripheral edge rolls on the tire tread surface, to thereby generate tire tread particulates; means for selectively adjusting and positioning the abrasive wheel with its rotational axis slightly askew of the tire axis, whereby the tire tread is required to skid on the abrasive wheel surface; and means to measure tread wear generated by the abrasive wheel.

2. The tester of claim 1 and further comprising means for maintaining a predetermined frictional pressure between the abrasive wheel and the tire tread surface.

3. The tester of claim 2 wherein the tire is mounted for movement in a vertical plane around a horizontal axis, and the abrasive wheel is mounted substantially directly above the tire on a lever arm that is adapted to swing freely in a vertical arc; said abrasive wheel having a horizontal rotational axis whereby the wheel rotates in a vertical plane on the uppermost area of the tire tread surface; the aforementioned pressure-maintaining means comprising weight means carried by the lever arm to gravitationally urge the abrasive wheel downwardly against the tire tread surface.

4. The tester of claim 1 wherein the measuring means includes vacuum means for collecting particulates generated by the abrasive wheel.

5. The tester of claim 1 wherein the measuring means includes means for measuring the depth of a groove formed in the tire tread surface by the abrasive wheel; said depth-measuring means comprising a pair of interconnected manually-retractable dial indicators having sensor elements adapted to simultaneously engage the groove bottom surface and the unabraided tread surface.

6. The tester of claim 1 and further comprising pressure means acting on the tire tread surface to simulate road surface pressures; said pressure means comprising a freely rotating drum having a smooth peripheral surface engaging the entire tread width to form a footprint, and fluid cylinder means operatively urging the drum against the tread surface.

7. A tire wear tester comprising power means for rotating a tire in a vertical plane about a horizontal axis; a non-powered abrasive wheel mounted for free rotation substantially directly above the tire rotational axis so that the peripheral edge of the wheel rests on the tire tread surface; a lever means for biasing the abrasive wheel downwardly to maintain a predetermined frictional pressure between the edge of the wheel and the tire tread surface, whereby the wheel is caused to generate tire tread particulates; and means to measure tread wear generated by the abrasive wheel.

8. The tester of claim 7 wherein the measuring means includes means for measuring the depth of a groove formed in the tire tread surface by the abrasive wheel; said depth-measuring means comprising a pair of interconnected manually-retractable dial indicators having sensor elements adapted to simultaneously engage the groove bottom surface and the unabraided tread surface.

* * * * *